US012627344B2

(12) United States Patent
Zhou et al.

(10) Patent No.: US 12,627,344 B2
(45) Date of Patent: May 12, 2026

(54) CHANNEL STATE INFORMATION REPORT CONFIGURATION

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 601 days.

(21) Appl. No.: 17/451,080

(22) Filed: Oct. 15, 2021

(65) Prior Publication Data

US 2022/0131587 A1    Apr. 28, 2022

Related U.S. Application Data

(60) Provisional application No. 63/198,508, filed on Oct. 23, 2020.

(51) Int. Cl.
| | |
|---|---|
| *H04B 7/06* | (2006.01) |
| *H04B 17/336* | (2015.01) |
| *H04L 5/00* | (2006.01) |
| *H04W 72/044* | (2023.01) |
| *H04B 7/08* | (2006.01) |
| *H04B 17/24* | (2015.01) |
| *H04B 17/345* | (2015.01) |

(52) U.S. Cl.
CPC ......... *H04B 7/0626* (2013.01); *H04B 7/0696* (2023.05); *H04B 7/06966* (2023.05); *H04B*

*17/336* (2015.01); *H04L 5/0048* (2013.01); *H04W 72/046* (2013.01)

(58) Field of Classification Search
CPC .. H04B 7/0491; H04B 7/0617; H04B 7/0619; H04B 7/0626; H04B 7/0639; H04B 7/0667; H04B 7/0695; H04B 7/0868; H04B 7/086088; H04B 17/328; H04B 17/326; H04B 17/345; H04W 72/046; H04W 72/11; H04W 72/231; H04W 24/02; H04W 24/10; H04L 5/0023; H04L 5/0048; H04L 5/0057; H04L 5/14
See application file for complete search history.

(56) References Cited

U.S. PATENT DOCUMENTS

| | | | | |
|---|---|---|---|---|
| 10,601,484 | B2 * | 3/2020 | Yum | .................... H04L 5/005 |
| 11,496,190 | B2 * | 11/2022 | Gan | .................... H04B 7/0452 |
| 2019/0312668 | A1 * | 10/2019 | Park | .................... H04L 5/0057 |

(Continued)

*Primary Examiner* — Kibrom T Hailu
*Assistant Examiner* — Scott A Schlack
(74) *Attorney, Agent, or Firm* — QUALCOMM Incorporated

(57) ABSTRACT

Various aspects of the present disclosure generally relate to wireless communication. In some aspects, a base station may transmit a channel state information (CSI) report configuration associated with multiple reference signal resource sets, all reference signal resources in each reference signal resource set associated with a different base station beam, for one or more of channel measurements or interference measurements. The base station may receive a report, based at least in part on the CSI report configuration, that indicates one or more base station beams recommended for subsequent communications with a user equipment (UE). Numerous other aspects are provided.

30 Claims, 10 Drawing Sheets

400 ↘

(56) References Cited

U.S. PATENT DOCUMENTS

| 2023/0006795 | A1* | 1/2023 | Gao | ................... | H04B 7/06968 |
|---|---|---|---|---|---|
| 2023/0198601 | A1* | 6/2023 | Kang | ..................... | H04W 8/22 |
| | | | | | 370/329 |
| 2023/0199517 | A1* | 6/2023 | Laddu | ................... | H04B 7/022 |
| | | | | | 370/329 |
| 2023/0284045 | A1* | 9/2023 | Go | ................... | H04B 7/06952 |
| | | | | | 370/329 |
| 2023/0370144 | A1* | 11/2023 | Zhang | ................. | H04L 5/0023 |

* cited by examiner

400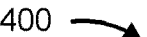

```
┌──────────┐                                                    ┌──────────┐
│   Base   │                                                    │          │
│ Station  │                                                    │    UE    │
│          │                                                    │          │
└──────────┘                                                    └──────────┘
     │                         405                                    │
     │──────────Transmit configuration information───────────────────▶│
     │                                                                 │
     │                                                    ┌────────────┴──────┐
     │                                                    │        410        │
     │                                                    │  Configure the UE │
     │                                                    └────────────┬──────┘
     │                         415                                     │
     │  Receive a CSI report configuration associated with multiple RS │
     │───────────resource sets, for beam measurements─────────────────▶│
     │                                                                 │
     │                         420                                     │
     │  Receive multiple sets of RSs with all reference signals in each│
     │──set of RSs associated with a different base station beam───────▶│
     │                                                                 │
     │                                                  ┌──────────────┴───┐
     │                                                  │       425        │
     │                                                  │ Perform a joint  │
     │                                                  │ procedure of base│
     │                                                  │  station beam    │
     │                                                  │ refinement and UE│
     │                                                  │ beam refinement  │
     │                                                  └──────────────┬───┘
     │                         430                                     │
     │  Transmit a report that indicates one or more base station      │
     │◀────beams to use for subsequent communications──────────────────│
     │                                                                 │
     │                         435                                     │
     │  Communicate using a base station beam and an associated        │
     │◀──UE beam based at least in part on the joint procedure─────────▶│
     │                                                                 │
```

FIG. 4

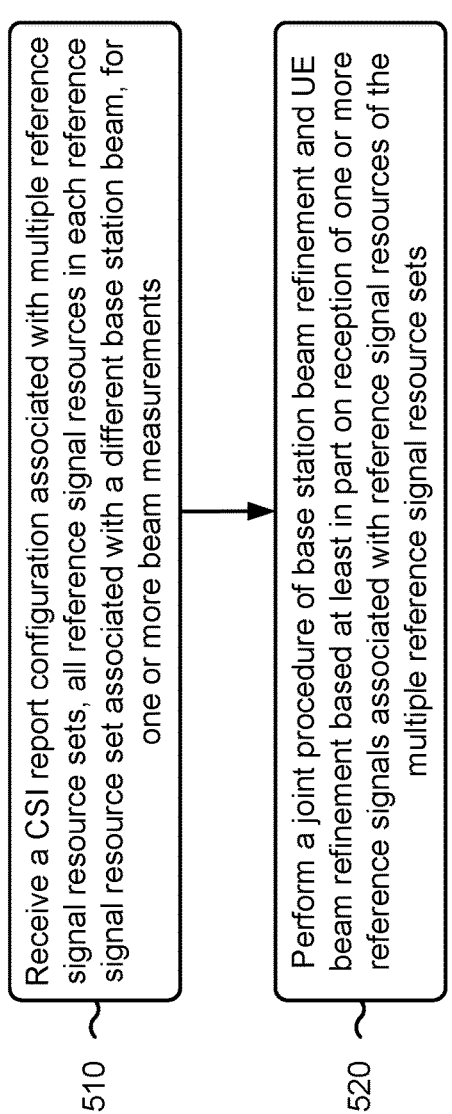

Receive a CSI report configuration associated with multiple reference signal resource sets, all reference signal resources in each reference signal resource set associated with a different base station beam, for one or more beam measurements

510

Perform a joint procedure of base station beam refinement and UE beam refinement based at least in part on reception of one or more reference signals associated with reference signal resources of the multiple reference signal resource sets

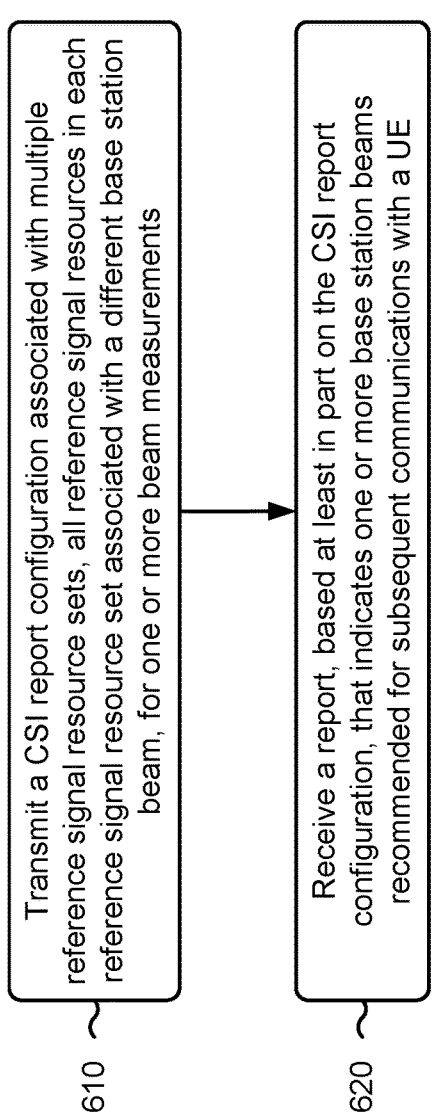

Transmit a CSI report configuration associated with multiple reference signal resource sets, all reference signal resources in each reference signal resource set associated with a different base station beam, for one or more beam measurements

610

Receive a report, based at least in part on the CSI report configuration, that indicates one or more base station beams recommended for subsequent communications with a UE

710 Receive a channel state information (CSI) report configuration associated with multiple reference signal resource sets, all reference signal resources in each reference signal resource set associated with a different base station beam, for one or more beam measurements 720 Receive reference signals of the reference signal resource sets

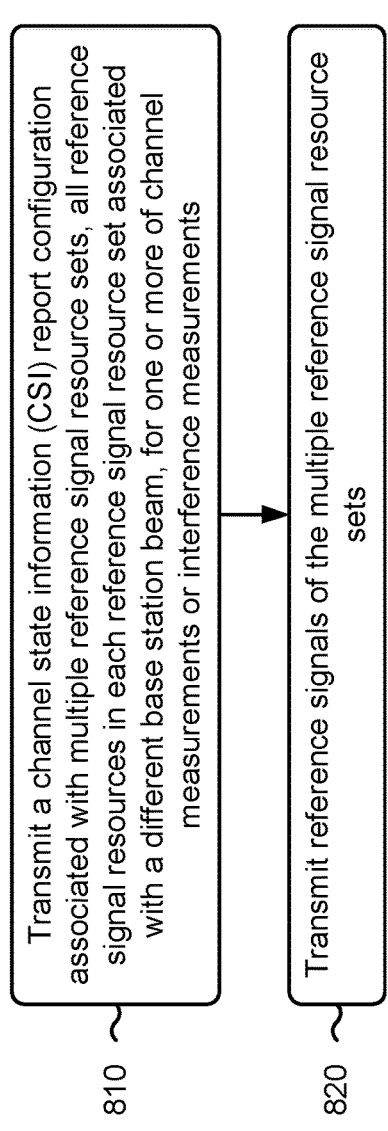

Transmit a channel state information (CSI) report configuration associated with multiple reference signal resource sets, all reference signal resources in each reference signal resource set associated with a different base station beam, for one or more of channel measurements or interference measurements

810

Transmit reference signals of the multiple reference signal resource sets

CHANNEL STATE INFORMATION REPORT CONFIGURATION

CROSS-REFERENCE TO RELATED APPLICATION

This Patent Application claims priority to U.S. Provisional Patent Application No. 63/198,508, filed on Oct. 23, 2020, entitled "CHANNEL STATE INFORMATION REPORT CONFIGURATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for configuring a channel state information report configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a channel state information (CSI) report configuration associated with multiple reference signal resource sets, all reference signal resources in each reference signal resource set associated with a different base station beam, for one or more beam measurements. The method may include receiving reference signals of the reference signal resource sets.

Some aspects described herein relate to a method of wireless communication performed by a base station. The method may include transmitting a CSI report configuration associated with multiple reference signal resource sets, all reference signal resources in each reference signal resource set associated with a different base station beam, for one or more of channel measurements or interference measurements. The method may include transmitting reference signals of the multiple reference signal resource sets.

Some aspects described herein relate to a UE for wireless communication. The user equipment may include a memory and one or more processors coupled to the memory. The one or more processors may be configured to receive a CSI report configuration associated with multiple reference signal resource sets, all reference signal resources in each reference signal resource set associated with a different base station beam, for one or more beam measurements. The one or more processors may be configured to receive reference signals of the reference signal resource sets.

Some aspects described herein relate to a base station for wireless communication. The base station may include a memory and one or more processors coupled to the memory. The one or more processors may be configured to transmit a CSI report configuration associated with multiple reference signal resource sets, all reference signal resources in each reference signal resource set associated with a different base station beam, for one or more of channel measurements or interference measurements. The one or more processors may be configured to transmit reference signals of the multiple reference signal resource sets.

Some aspects described herein relate to a non-transitory computer-readable medium that stores a set of instructions for wireless communication by a UE. The set of instructions, when executed by one or more processors of the UE, may cause the UE to receive a CSI report configuration associated with multiple reference signal resource sets, all reference signal resources in each reference signal resource set associated with a different base station beam, for one or more beam measurements. The set of instructions, when executed by one or more processors of the UE, may cause the UE to receive reference signals of the reference signal resource sets.

Some aspects described herein relate to a non-transitory computer-readable medium that stores a set of instructions for wireless communication by a base station. The set of instructions, when executed by one or more processors of the base station, may cause the base station to transmit a CSI report configuration associated with multiple reference signal resource sets, all reference signal resources in each reference signal resource set associated with a different base station beam, for one or more of channel measurements or interference measurements. The set of instructions, when executed by one or more processors of the base station, may cause the base station to transmit reference signals of the multiple reference signal resource sets.

Some aspects described herein relate to an apparatus for wireless communication. The apparatus may include means for receiving a CSI report configuration associated with multiple reference signal resource sets, all reference signal resources in each reference signal resource set associated with a different base station beam, for one or more beam measurements. The apparatus may include means for receiving reference signals of the reference signal resource sets.

Some aspects described herein relate to an apparatus for wireless communication. The apparatus may include means for transmitting a CSI report configuration associated with multiple reference signal resource sets, all reference signal resources in each reference signal resource set associated with a different base station beam, for one or more of channel measurements or interference measurements. The apparatus may include means for transmitting reference signals of the multiple reference signal resource sets.

In some aspects, a method of wireless communication performed by a UE includes receiving a CSI report configuration associated with multiple reference signal resource sets, all reference signal resources in each reference signal resource set associated with a different base station beam, for one or more of channel measurements or interference measurements; and performing a joint procedure of base station beam refinement and UE beam refinement based at least in part on reception of one or more reference signals associated with reference signal resources of the multiple reference signal resource sets.

In some aspects, a method of wireless communication performed by a base station includes transmitting a CSI report configuration associated with multiple reference signal resource sets, all reference signal resources in each reference signal resource set associated with a different base station beam, for one or more of channel measurements or interference measurements; and receiving a report, based at least in part on the CSI report configuration, that indicates one or more base station beams recommended for subsequent communications with a UE.

In some aspects, a UE for wireless communication includes a memory; and one or more processors coupled to the memory, the one or more processors configured to: receive a CSI report configuration associated with multiple reference signal resource sets, all reference signal resources in each reference signal resource set associated with a different base station beam, for one or more of channel measurements or interference measurements; and perform a joint procedure of base station beam refinement and UE beam refinement based at least in part on reception of one or more reference signals associated with reference signal resources of the multiple reference signal resource sets.

In some aspects, a base station for wireless communication includes a memory; and one or more processors coupled to the memory, the one or more processors configured to: transmit a CSI report configuration associated with multiple reference signal resource sets, all reference signal resources in each reference signal resource set associated with a different base station beam, for one or more of channel measurements or interference measurements; and receive a report, based at least in part on the CSI report configuration, that indicates one or more base station beams recommended for subsequent communications with a UE.

In some aspects, a non-transitory computer-readable medium storing a set of instructions for wireless communication includes one or more instructions that, when executed by one or more processors of a UE, cause the UE to: receive a CSI report configuration associated with multiple reference signal resource sets, all reference signal resources in each reference signal resource set associated with a different base station beam, for one or more of channel measurements or interference measurements; and perform a joint procedure of base station beam refinement and UE beam refinement based at least in part on reception of one or more reference signals associated with reference signal resources of the multiple reference signal resource sets.

In some aspects, a non-transitory computer-readable medium storing a set of instructions for wireless communication includes one or more instructions that, when executed by one or more processors of a base station, cause the base station to: transmit a CSI report configuration associated with multiple reference signal resource sets, all reference signal resources in each reference signal resource set associated with a different base station beam, for one or more of channel measurements or interference measurements; and receive a report, based at least in part on the CSI report configuration, that indicates one or more base station beams recommended for subsequent communications with a UE.

In some aspects, an apparatus for wireless communication includes means for receiving a CSI report configuration associated with multiple reference signal resource sets, all reference signal resources in each reference signal resource set associated with a different base station beam, for one or more of channel measurements or interference measurements; and means for performing a joint procedure of base station beam refinement and apparatus beam refinement based at least in part on reception of one or more reference signals associated with reference signal resources of the multiple reference signal resource sets.

In some aspects, an apparatus for wireless communication includes means for transmitting a CSI report configuration associated with multiple reference signal resource sets, all reference signal resources in each reference signal resource set associated with a different apparatus beam, for one or more of channel measurements or interference measurements; and means for receiving a report, based at least in part on the CSI report configuration, that indicates one or more apparatus beams recommended for subsequent communications with a UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example associated with configuring a channel state information report configuration, in accordance with the present disclosure.

FIGS. 5-8 are diagrams illustrating example processes associated with configuring a channel state information report configuration, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
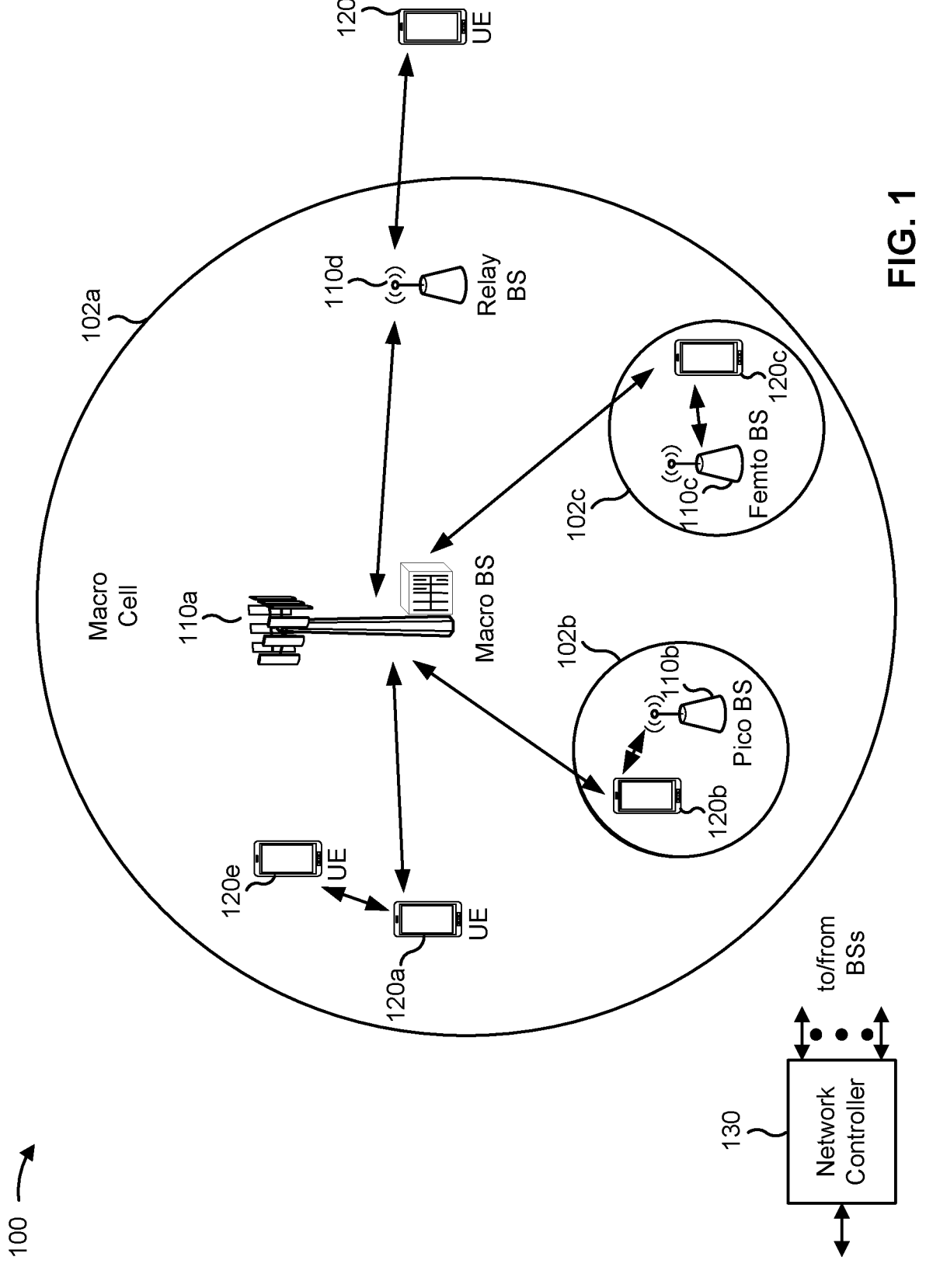
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE).

UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
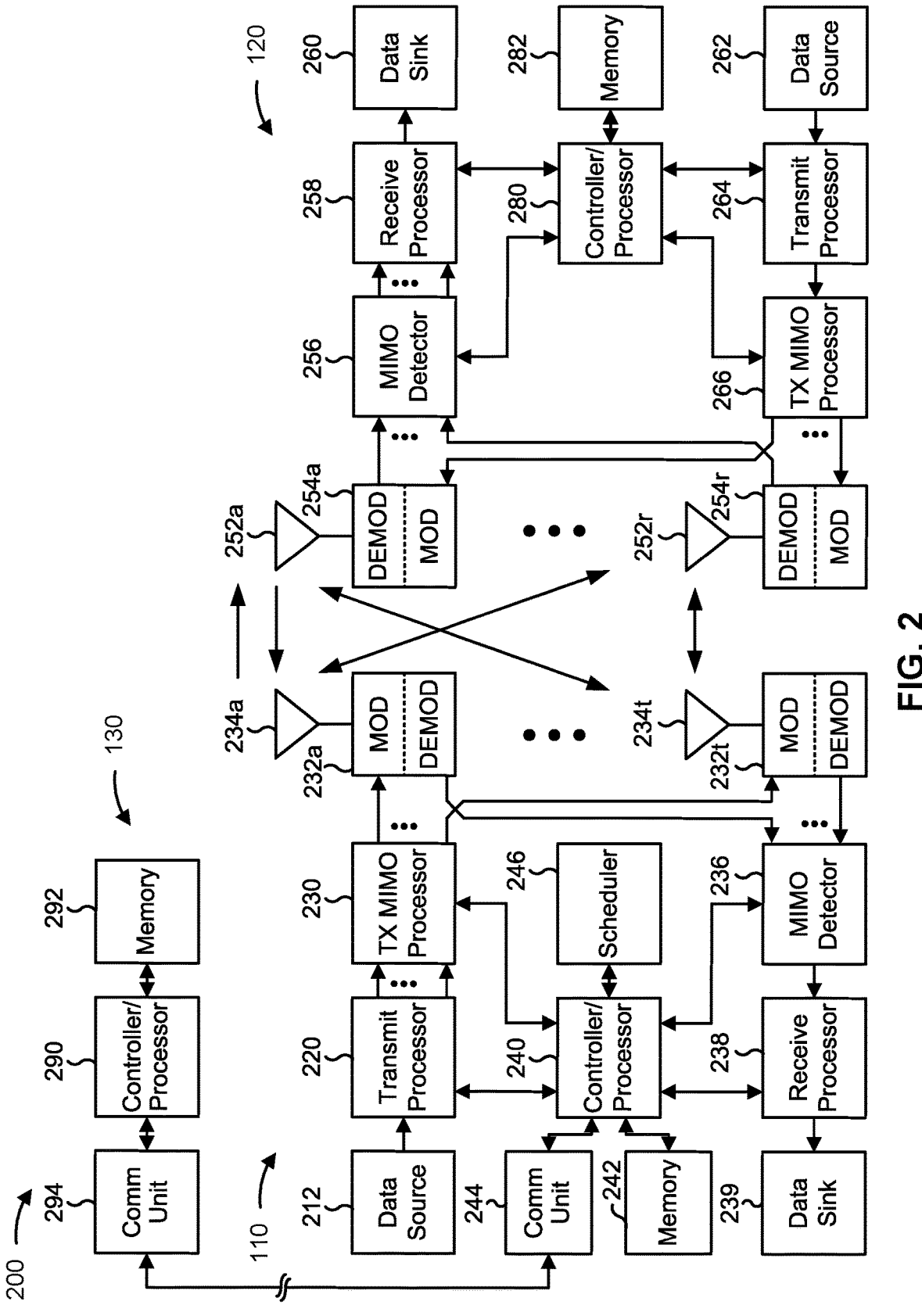
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-6).

Controller/processor 240 of base station 110, controller/processor 280 of UE 120, and/or any other component(s) of FIG. 2 may perform one or more techniques associated with configuring a channel state information report configuration, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE includes means for receiving a channel state information (CSI) report configuration associated with multiple reference signal resource sets, all reference signal resources in each reference signal resource set associated with a different base station beam, for one or more beam measurements; and/or means for receiving reference signals of the reference signal resource sets. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for transmitting a CSI report configuration associated with multiple reference signal resource sets, all reference signal resources in each reference signal resource set associated with a different base station beam, for one or more of channel measurements or interference measurements; and/or means for transmitting reference signals of the multiple reference signal resource sets. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the UE includes means for receiving a CSI report configuration associated with multiple reference signal resource sets, all reference signal resources in each reference signal resource set associated with a different base station beam, for one or more of channel measurements or interference measurements; and/or means for performing a joint procedure of base station beam refinement and UE beam refinement based at least in part on reception of one or more reference signals associated with reference signal resources of the multiple reference signal resource sets. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE includes means for determining preferred UE beams to use with one or more recommended base station beams for subsequent communications.

In some aspects, the UE includes means for receiving, using a first UE beam, a first reference signal associated with a first reference signal resource of a first reference signal resource set, associated with a first base station beam; means for receiving, using a second UE beam, a second reference signal associated with a second reference signal resource of the first reference signal resource set, associated with a first base station beam; means for receiving, using the first UE beam, a third reference signal associated with a third reference signal resource of a second reference signal resource set, associated with a second base station beam; and/or means for receiving, using the second UE beam, a fourth reference signal associated with a fourth reference signal resource of the second reference signal resource set, associated with a second base station beam.

In some aspects, the UE includes means for determining to use the first UE beam or the second UE beam for subsequent communications using a first base station beam associated with the first reference signal resource set; or means for determining to use the first UE beam or the second UE beam for subsequent communications using a second base station beam associated with the second reference signal resource set.

In some aspects, the UE includes means for determining one or more base station beams, paired with one or more UE beams, to recommend for subsequent communications.

In some aspects, the UE includes means for transmitting a report that indicates the one or more base station beams to recommend for the subsequent communications.

In some aspects, the UE includes means for measuring a layer 1 signal-to-interference-plus-noise ratio (SINR) associated with pairs of channel measurement resources and interference measurement resources using multiple UE beams.

In some aspects, the UE includes means for transmitting a report that indicates one or more base station beams associated with one or more paired UE beams to recommend for subsequent communications based at least in part on measuring layer 1 SINRs associated with pairs of channel measurement resources and interference measurement resources using different UE beams.

In some aspects, the base station includes means for transmitting a CSI report configuration associated with multiple reference signal resource sets, all reference signal resources in each reference signal resource set associated with a different base station beam, for one or more of channel measurements or interference measurements; and/or means for receiving a report, based at least in part on the CSI report configuration, that indicates one or more base station beams recommended for subsequent communications with a UE. The means for the base station to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station includes means for receiving, using a first UE beam, a first reference signal associated with a first reference signal resource of a first reference signal resource set that is associated with a first base station beam; means for receiving, using a second UE beam, a second reference signal associated with a second reference signal resource of the first reference signal resource set that is associated with the first base station beam; means for receiving, using the first UE beam, a third reference signal associated with a third reference signal resource of a second reference signal resource set that is associated with a second base station beam; and/or means for receiving, using the second UE beam, a fourth reference signal associated with a fourth reference signal resource of the second reference signal resource set that is associated with the second base station beam.

In some aspects, the base station includes means for transmitting, based at least in part on the CSI report configuration, one or more reference signals comprising one or more of: CSI reference signals, or synchronization signal blocks.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
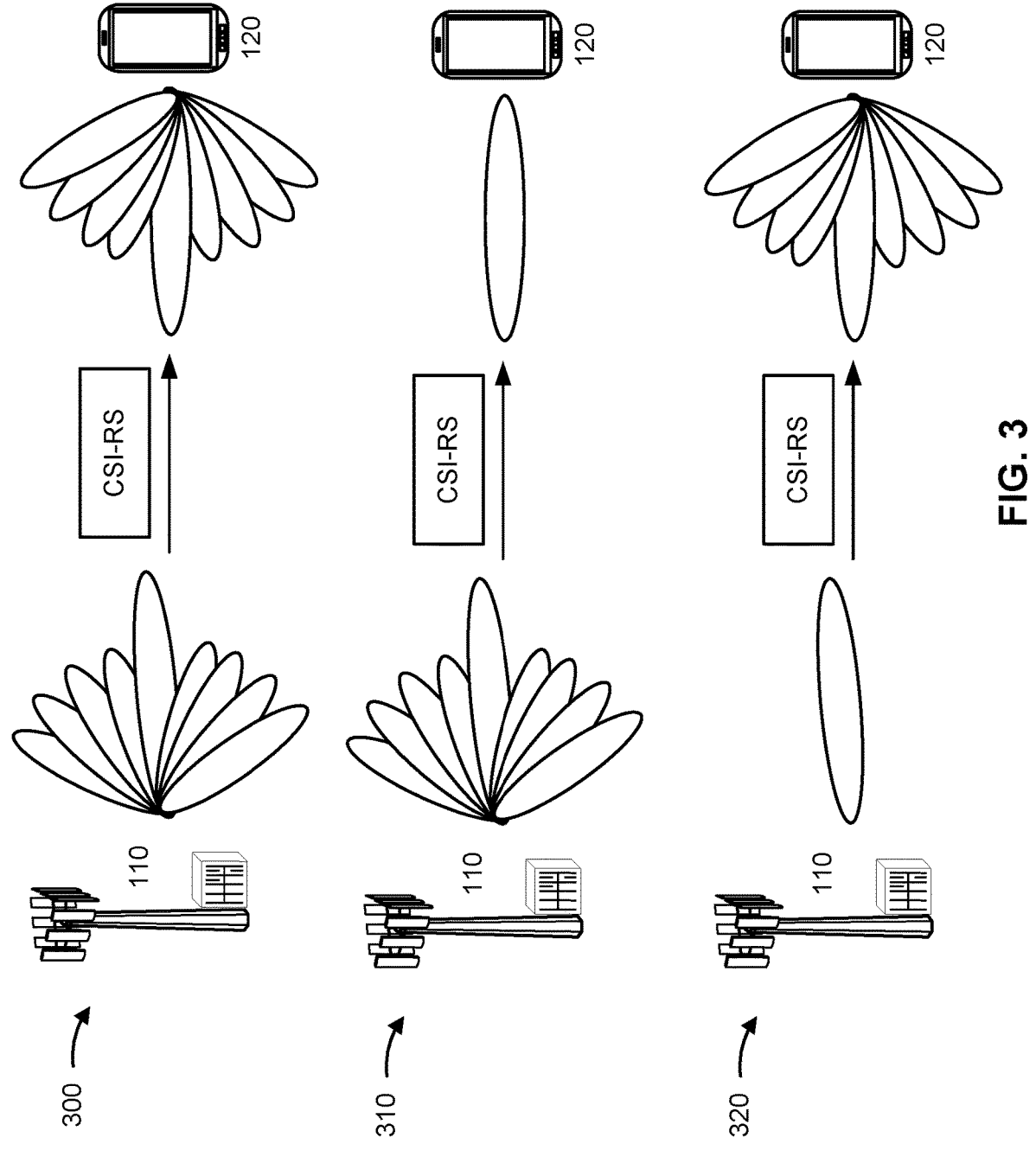
FIG. 3 is a diagram illustrating an example of beam management procedures, in accordance with the present disclosure.

FIG. 3 is a diagram illustrating examples 300, 310, and 320 of beam management procedures, in accordance with the present disclosure. As shown in FIG. 3, examples 300, 310, and 320 include a UE 120 in communication with a base station 110 in a wireless network (e.g., wireless network 100). However, the devices shown in FIG. 3 are provided as examples, and the wireless network may support communication and beam management between other devices (e.g., between a UE 120 and a base station 110 or TRP, between a mobile termination node and a control node, between an integrated access and backhaul (IAB) child node and an IAB parent node, between a scheduled node and a scheduling node, and/or the like). In some aspects, the UE 120 and the base station 110 may be in a connected state (e.g., a radio resource control (RRC) connected state and/or the like).

As shown in FIG. 3, example 300 may include a base station 110 and a UE 120 communicating to perform beam management using CSI reference signals (CSI-RSs). Example 300 depicts a first beam management procedure (e.g., P1 beam management). The first beam management procedure may be referred to as a beam selection procedure, an initial beam acquisition procedure, a beam sweeping procedure, a cell search procedure, a beam search procedure, and/or the like. As shown in FIG. 3 and example 300, CSI-RSs may be configured to be transmitted from the base station 110 to the UE 120. The CSI-RSs may be configured to be periodic (e.g., using RRC signaling and/or the like), semi-persistent (e.g., using media access control (MAC) control element (MAC-CE) signaling and/or the like), and/or aperiodic (e.g., using downlink control information (DCI) and/or the like).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same reference signal (RS) resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 300 has been described in connection with CSI-RSs, the first beam management process may also use synchronization signal blocks (SSBs) for beam management in a similar manner as described above.

As shown in FIG. 3, example 310 may include a base station 110 and a UE 120 communicating to perform beam management using CSI-RSs. Example 310 depicts a second beam management procedure (e.g., P2 beam management). The second beam management procedure may be referred to as a beam refinement procedure, a base station beam refinement procedure, a TRP beam refinement procedure, a transmit beam refinement procedure, and/or the like. As shown in FIG. 3 and example 310, CSI-RSs may be configured to be transmitted from the base station 110 to the UE 120. The CSI-RSs may be configured to be aperiodic (e.g., using DCI and/or the like). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120.

As shown in FIG. 3, example 320 depicts a third beam management procedure (e.g., P3 beam management). The third beam management procedure may be referred to as a beam refinement procedure, a UE beam refinement procedure, a receive beam refinement procedure, and/or the like. As shown in FIG. 3 and example 320, one or more CSI-RSs may be configured to be transmitted from the base station 110 to the UE 120. The CSI-RSs may be configured to be aperiodic (e.g., using DCI and/or the like). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

As indicated above, FIG. 3 is provided as an example of beam management procedures. Other examples of beam management procedures may differ from what is described with respect to FIG. 3. For example, the UE 120 and the base station 110 may perform the third beam management procedure before performing the second beam management procedure, the UE 120 and the base station 110 may perform a similar beam management procedure to select a UE transmit beam, and/or the like.

In some networks, the base station beam refinement procedure (e.g., P2 beam management procedure) and the UE beam refinement procedure (e.g., P3 beam management procedure) may be performed sequentially. For example, the base station and the UE may perform base station beam refinement to select a best base station beam based at least in part on a UE report via measurement by a fixed and/or unrefined UE beam (e.g., a UE reception beam). After performing the base station beam refinement, the base station may schedule (e.g., via a DCI message) resources for UE beam refinement. The base station may transmit repetitions of reference signals via the selected best base station beam, and the UE may beam sweep through multiple UE beams to determine a best UE beam to receive subsequent communications transmitted via the selected best base station beam.

Based at least in part on performing base station beam refinement and UE beam refinement sequentially, as described, latency between selecting the best base station beam and the best UE beam associated with the best base station beam may delay subsequent communications. For example, an offset between the UE reporting the best base station beam and scheduling the resources for UE beam refinement may include 5 or more slots. Additionally, scheduling base station beam refinement and UE beam refinement separately may consume network resources.

In some aspects described herein, a UE may perform a joint procedure of base station beam refinement and UE beam refinement by measuring reference signals over multiple reference signal resource sets (e.g., CSI-RS resource sets and/or SSB resource sets). For example, instead of performing base station beam refinement and UE beam refinement sequentially, a base station may transmit repetitions of a reference signal (e.g., n repetitions) for each of multiple base station beams. The UE may receive each repetition associated with a particular base station beam using different UE beams. In this way, the UE may refine UE beams (e.g., select a best UE receive beam) for the particular base station beam. The UE may similarly receive each repetition associated with each base station beam to determine one or more preferred base station beam and UE beam pairs. In this way, the base station and the UE may jointly perform base station beam refinement and UE beam refinement using multiple reference signal resource sets (e.g., with each set associated with repetitions for a particular base station beam). In some aspects, a base station may transmit a single CSI report configuration (e.g., a CSI-ReportConfig) to configure the multiple reference signal resource sets for channel measurement and/or for interference measurement.

In some aspects, the base station may transmit all reference signals associated with all resources in each reference signal resource set based at least in part on configuring a parameter (e.g., repetition ON) for the reference signal resource set. In some aspects, the base station may indicate a transmission configuration indicator (TCI) associated with each reference signal resource set.

In some aspects, the UE may perform a beam sweep procedure over reference signals (e.g., repetitions of a reference signal) associated with each reference signal resource set to identify a best UE beam associated with each base station beam. The UE may report on one or more base station beams over which the UE received a reference signal with a metric that satisfies a threshold and/or on a configured number of base station beams having a best metric, among other examples.

In some aspects, the UE may indicate a base station beam within the report based at least in part on a corresponding resource set identification (e.g., a resource set identification associated with the base station beam), and/or a resource identification of a resource within the corresponding resource set. In some aspects, the resource identification may be configured (e.g., via RRC signaling) with a global identification, the resource identification may be a location index of a resource among all resources configured for channel measurement and/or interference measurement associated with the report (e.g., associated with the CSI report configuration). In some aspects, the location index may be any index associated with a resource in a corresponding resource set or may be a particular resource in the corresponding resource set (e.g., a first resource or a last resource in the corresponding resource set).

In some aspects, the joint procedure of base station beam refinement and UE beam refinement may be extended to reporting layer 1 (L1) SINR as one or more metrics included in the report. For example, for each of multiple base station beams, the base station may configure a reference signal resource set to transmit a reference signal a first number of times (e.g., a reference signal with repetitions to total the first number). In some aspects, the base station may configure pairs of channel measurement resources (CMRs) and interference measurement resources (IMRs) for each transmission of the reference signal. For example, the base station may indicate (e.g., with a repetition ON parameter) that all CMRs of a set of CMRs are to be transmitted via a first base station beam and may indicate that all IMRs of a set of IMRs, paired with the set of CMRs, are to be transmitted with the first base station beam or a second base station beam.

For each set of CMRs and paired set of IMRs, the UE may use one or more UE beams to measure corresponding L1-SINR metrics and/or determine one or more CMR and IMR pairs (e.g., a configured number of pairs) that are associated with highest L1-SINR metrics. Additionally, or alternatively, the UE may determine UE beams used to obtain the highest L1-SINR metrics to pair with the one or more CMR and IMR pairs. The UE may report the CMR and IMR pairs that are associated with highest L1-SINR metrics. In some aspects, the UE may identify an associated base station beam based at least in part on a resource identification of an associated CMR and/or an associated IMR. The resource identification may be configured based at least in part on a global identification (e.g., via RRC signaling) and/or a location index of a resource, associated with the CMR or IMR, among all resources configured for channel measurement and/or interference measurement associated with the report (e.g., associated with the CSI report configuration). In some aspects, the location index may be any index associated with a resource in a corresponding resource set or may be a particular resource in the corresponding set of CMRs or IMRs (e.g., a first resource or a last resource in the corresponding resource set).

Based at least in part on a UE receiving a CSI report configuration associated with multiple reference signal resources sets and performing a joint procedure of base station refinement and UE beam refinement, the UE and the base station may conserve network resources that may otherwise have been used to separately schedule base station refinement and UE beam refinement and/or may reduce a collective latency of the base station refinement and UE beam refinement.

FIG. 4 is a diagram illustrating an example 400 associated with configuring a CSI report configuration, in accordance with the present disclosure. As shown in FIG. 4, a UE (e.g., UE 120) may communicate with a base station (e.g., base station 110). The UE and the base station may be part of a wireless network (e.g., wireless network 100). In some aspects, the UE and the base station may perform one or more beam management procedures.

As shown by reference number 405, the base station may transmit, and the UE may receive, configuration information. In some aspects, the UE may receive configuration information from another device (e.g., from another base station and/or another UE) and/or a communication standard, among other examples. In some aspects, the UE may receive the configuration information via one or more of RRC signaling or MAC signaling (e.g., MAC-CEs), and/or may determine the configuration information from a communication standard, among other examples. In some aspects, the configuration information may include an indication of one or more configuration parameters (e.g., already known to the UE) for selection by the UE, explicit configuration information for the UE to use to configure the UE, and/or the like.

In some aspects, the configuration information may indicate that the UE is to receive a CSI report configuration associated with multiple reference signal resource sets (e.g., CSI-RS resource sets and/or SSB resource sets, among other examples). In some aspects, the configuration information may indicate that the UE is to determine whether all reference signal resources in each reference signal resource set is associated with a different base station beam. In other words, whether all reference signal resources in a first reference signal resource set are associated with a first beam and all reference signal resources in a second reference signal resource set are associated with a second beam, etc. In some aspects, the configuration information may indicate that the UE is to perform channel measurements and/or interference measurements using the multiple reference signal resources sets, based at least in part on the CSI report configuration.

In some aspects, the configuration information may indicate that the UE is to perform a joint procedure of base station beam refinement and UE beam refinement based at least in part on reception of one or more reference signals associated with reference signal resources of the multiple reference signal resource sets. For example, the configuration information may indicate that the UE is to beam sweep through a set of UE beams for each reference signal resource set to determine one or more best base station beams and corresponding one or more best UE beams for receiving subsequent communications that the base station may transmit via the one or more best base station beams. In some aspects, the configuration information may indicate that the UE is to determine a best base station beam and a best UE beam based at least in part on one or more metrics associated with receiving a reference signal transmitted via the best base station beam and received via the best UE beam.

In some aspects, the configuration information may indicate that the UE is to transmit a report that indicates one or more base station beams (e.g., the one or more best base station beams) to use for subsequent communications (e.g., as recommended by the UE). In some aspects, the configuration information may indicate a format for indicating the one or more base station beams and/or one or more metrics associated with the one or more base station beams.

As shown by reference number 410, the UE may configure the UE for communicating with the base station. In some aspects, the UE may configure the UE based at least in part on the configuration information. In some aspects, the UE may be configured to perform one or more operations described herein.

As shown by reference number 415, the UE may receive, and the base station may transmit, a CSI report configuration associated with multiple RS resource sets, for beam measurements (e.g., channel measurements and/or interference measurements). In some aspects, all reference signal resources in each reference signal resource set may be associated with a different base station beam. For example, all reference signals in a first reference signal resource set may be associated with a first base station beam, all reference signals in a second reference signal resource set may be associated with a second base station beam, and/or all reference signals in a third reference signal resource set may be associated with a third base station beam, among other examples.

In some aspects, the CSI report configuration may include a first indication (e.g., within a repetition field associated with all reference signal resources in a first reference signal resource set) that all reference signal resources in the first reference signal resource set are associated with a first base station beam. In some aspects, the CSI report configuration may include a second indication (e.g., within a repetition field associated with all reference signal resources in a second reference signal resource set) that all reference signal resources in the second reference signal resource set are associated with a second base station beam.

In some aspects, the CSI report configuration may indicate that a first reference signal resource set (e.g., a first CMR resource set) is associated with a first base station beam via a first TCI state identification (e.g., including an indication of quasi-co-location information) and/or that a second reference signal resource set (e.g., a second CMR resource set) is associated with a second base station beam via a second TCI state identification (e.g., including an indication of quasi-co-location information), among other examples.

In some aspects (e.g., for measuring L1-SINR), the CSI report configuration may indicate a configuration of a first set of channel measurement resources with repetitions to be used to receive, via multiple UE beams, a first set of reference signals transmitted via a first base station beam. The CSI report configuration may also indicate a configuration of a first set of interference measurement resources with repetitions, paired with the first set of channel measurement resources, to be used to receive, via the multiple UE beams, the first set of reference signals transmitted via the first base station beam. Similarly, the CSI report configuration may indicate a configuration of a second set of channel measurement resources with repetitions to be used to receive, via the multiple UE beams, a second set of reference signals transmitted via a second base station beam, and a configuration of a second set of interference measurement resources with repetitions, paired with the second set of channel measurement resources, to be used to receive, via the second base station beam using multiple UE beams, the second set of reference signals transmitted via the second base station beam.

In some aspects, the multiple reference signal resource sets comprise CMR resource sets and/or interference measurement resource sets.

As shown by reference number 420, the UE may receive, and the base station may transmit, multiple sets of reference signals with all reference signals in each set of reference signals associated with a different base station beam. In some aspects, the reference signals may include one or more CSI reference signals and/or one or more SSBs.

As shown by reference number 425, the UE may perform a joint procedure of base station beam refinement and UE beam refinement. In some aspects, the joint procedure of base station beam refinement may include measuring reference signals within each set of reference signals via different UE beams. For example, the UE may receive one or more reference signals associated with reference signal resources of the multiple reference signal resource sets, and perform the joint procedure based at least in part on reception and/or measurement of the one or more reference signals.

In some aspects, the UE may receive, using a first UE beam, a first reference signal resource associated with a first reference signal resource set that is associated with a first base station beam. The UE may receive, using a second UE beam, a second reference signal resource associated with the first reference signal resource set that is associated with a first base station beam. The UE may receive, using a first UE beam, a third reference signal resource associated with a second reference signal resource set that is associated with a second base station beam. The UE may receive, using a second UE beam, a fourth reference signal resource associated with the second reference signal resource set that is associated with a second base station beam.

In some aspects, the UE may beam sweep through a number of UE beams to measure a first set of reference signals associated with a first reference signal resource set. In this way, the UE may determine a preferred UE beam for pairing with a base station beam that is associated with the first reference signal resource set. The UE may similarly sweep through the number of UE beams to measure additional sets of reference signals associated with additional reference signal resources sets to determine preferred UE beams (e.g., refined UE beams) for pairing with each base station beam (e.g., based at least in part on metrics associated with reference signal resources sets that are associated with each base station beam). The UE may further determine a preferred UE beam and base station beam pair, a configured number of preferred UE beam and base station beam pairs, and/or each preferred UE beam and base station beam pair that satisfy a metric (e.g., RSRP and/or L1-SINR, among other examples). In some aspects, the UE may determine to recommend, to the base station, one or more base station beams (e.g., of one or more preferred UE beam and base station beam pairs) for subsequent communications.

In some aspects, the UE may determine to use a first UE beam or a second UE beam for subsequent communications for which the base station transmits using a first base station beam associated with a first reference signal resource set and/or the UE may determine to use the first UE beam or the second UE beam for subsequent communications for which the base station transmits using a second base station beam associated with a second reference signal resource set. In other words, the UE may store preferred UE beams associated with recommended base station beams so the UE may select a preferred UE beam based at least in part on the base station selecting a corresponding recommended base station beam.

In some aspects, the UE may measure L1-SINR metrics associated with pairs of channel measurement resources and interference measurement resources using multiple UE beams. For example, the UE may measure L1-SINR metrics based at least in part on the CSI report configuration indicating one or more configurations of pairs of channel measurement resources and interference measurement resources, with each pair associated with a base station beam.

As shown by reference number 430, the UE may transmit, and the base station may receive, a report that indicates one or more base station beams to use for subsequent communications. In some aspects, the report may indicate one more beam metrics associated with the one or more base station beams.

In some aspects, the report may indicate a base station beam, of the one or more base station beams, via an identification of a reference signal resource set associated with the base station beam and/or a resource identification of a reference signal resource of the reference signal resource set associated with the base station beam, among other examples. In some aspects, the resource identification may include a resource identification as defined in RRC signaling and/or a resource identification as defined by a location index of a resource of an associated reference signal resource set.

In some aspects, the location index may include an index associated with any location within the associated reference signal resource set and/or an index associated with a particular location within the associated reference signal resource set. For example, if a CSI report configuration is associated with 3 reference signal resource sets that correspond to 3 base station beams with 8 reference signal resources per reference signal resource set, the CSI report configuration may index the reference signals from 0-23 with indexes 0-7 associate with a first base station beam, indexes 8-15 associated with a second base station beam, and indexes 16-23 associated with a third base station beam. Based at least in part on the report indicating index 0 and index 16, the base station may determine that the report indicates that the first base station beam and the third base station beams are recommended base station beams and/or that reported beam metrics are associated with the first base station beam and the third base station beam.

In some aspects, the report may indicate report one or more base station beams associated with one or more paired UE beams to recommend for subsequent communications based at least in part on measuring layer 1 SINRs associated with pairs of channel measurement resources and interference measurement resources.

In some aspects, the report may indicate a base station beam, of the one or more base station beams, via a resource identification of a reference signal resource of the first set of channel measurement resources, a resource identification of a reference signal resource of the first set of interference measurement resources, a resource identification of a reference signal resource of the second set of channel measurement resources, and/or a resource identification of a reference signal resource of the second set of interference measurement resources.

In some aspects, the resource identification may include a resource identification as defined in RRC signaling, a resource identification as defined by a location index of a resource of the first set of channel measurement resources, a resource identification as defined by a location index of a resource of the first set of interference measurement resources, a resource identification as defined by a location index of a resource of the second set of channel measurement resources, and/or a resource identification as defined by a location index of a resource of the second set of interference measurement resources.

In some aspects, the location index comprises an index associated with any location within the associated reference signal resource set and/or an index associated with a particular location within the associated reference signal resource set.

In some aspects, the joint procedure of the base station beam refinement and the UE beam refinements referenced at reference number 420 may include transmitting the report.

As shown by reference number 435, the base station and the UE may communicate using a base station beam and an associated UE beam based at least in part on the joint procedure. For example, the base station may indicate a selected base station beam for subsequent communications (e.g., based at least in part on the report) and the UE may select a preferred UE beam to use with the selected base station beam based at least in part on performing the joint procedure to determine preferred base station beam and UE beam pairings.

Based at least in part on a UE receiving a CSI report configuration associated with multiple reference signal resources sets and performing a joint procedure of base station refinement and UE beam refinement, the UE and the base station may conserve network resources that may otherwise have been used to separately schedule base station refinement and UE beam refinement and/or may reduce a collective latency of the base station refinement and UE beam refinement.

As indicated above, FIG. 4 is provided as an example. Other examples may differ from what is described with regard to FIG. 4.

FIG. 5 is a diagram illustrating an example process 500 performed, for example, by a UE, in accordance with the present disclosure. Example process 500 is an example where the UE (e.g., UE 120) performs operations associated with configuring CSI report configurations.

As shown in FIG. 5, in some aspects, process 500 may include receiving a CSI report configuration associated with multiple reference signal resource sets, all reference signal resources in each reference signal resource set associated with a different base station beam, for one or more beam measurements (e.g., one or more of channel measurements or interference measurements) (block 510). For example, the UE (e.g., using reception component 702, depicted in FIG. 7) may receive a CSI report configuration associated with multiple reference signal resource sets, all reference signal resources in each reference signal resource set associated with a different base station beam, for one or more beam measurements (e.g., one or more of channel measurements or interference measurements), as described above.

As further shown in FIG. 5, in some aspects, process 500 may include performing a joint procedure of base station beam refinement and UE beam refinement based at least in part on reception of one or more reference signals associated with reference signal resources of the multiple reference signal resource sets (block 520). For example, the UE (e.g., using reception component 702 and/or determination component 708) may perform a joint procedure of base station beam refinement and UE beam refinement based at least in part on reception of one or more reference signals associated with reference signal resources of the multiple reference signal resource sets, as described above.

Process 500 may include additional aspects, such as any single aspect or any combination of aspects described below and/or in connection with one or more other processes described elsewhere herein.

In a first aspect, UE beam refinement comprises determining preferred UE beams to use with one or more recommended base station beams for subsequent communications.

In a second aspect, alone or in combination with the first aspect, the CSI report configuration includes a first indication, within a repetition field associated with all reference signal resources in a first reference signal resource set, that each of the all reference signal resources in the first reference signal resource set is associated with a first base station beam, and wherein the CSI report configuration includes a second indication, within a repetition field associated with all reference signal resources in a second reference signal resource set, that each of the all reference signal resources in the second reference signal resource set is associated with a second base station beam.

In a third aspect, alone or in combination with one or more of the first and second aspects, performing the joint procedure of base station beam refinement and UE beam refinement comprises receiving, using a first UE beam, a first reference signal associated with a first reference signal resource of a first reference signal resource set, associated with a first base station beam, receiving, using a second UE beam, a second reference signal associated with a second reference signal resource of the first reference signal resource set, associated with a first base station beam, receiving, using the first UE beam, a third reference signal associated with a third reference signal resource of a second reference signal resource set, associated with a second base station beam, and receiving, using the second UE beam, a fourth reference signal associated with a fourth reference signal resource of the second reference signal resource set, associated with a second base station beam.

In a fourth aspect, alone or in combination with one or more of the first through third aspects, UE beam refinement comprises one or more of determining to use the first UE beam or the second UE beam for subsequent communications using a first base station beam associated with the first reference signal resource set, or determining to use the first UE beam or the second UE beam for subsequent communications using a second base station beam associated with the second reference signal resource set.

In a fifth aspect, alone or in combination with one or more of the first through fourth aspects, the one or more reference signals comprise one or more of CSI reference signals, or signal blocks.

In a sixth aspect, alone or in combination with one or more of the first through fifth aspects, the CSI report configuration indicates, via a first TCI state identification, that a first reference signal resource set is associated with a first base station beam, and wherein the CSI report configuration indicates, via a second TCI state identification, that a second reference signal resource set is associated with a second base station beam.

In a seventh aspect, alone or in combination with one or more of the first through sixth aspects, base station beam refinement comprises determining one or more base station beams, paired with one or more UE beams, to recommend for subsequent communications.

In an eighth aspect, alone or in combination with one or more of the first through seventh aspects, base station beam refinement comprises transmitting a report that indicates the one or more base station beams to recommend for the subsequent communications.

In a ninth aspect, alone or in combination with one or more of the first through eighth aspects, the report indicates a base station beam, of the one or more base station beams, via one or more of an identification of a reference signal resource set associated with the base station beam, or a resource identification of a reference signal resource of the reference signal resource set associated with the base station beam.

In a tenth aspect, alone or in combination with one or more of the first through ninth aspects, the resource identification comprises a resource identification as defined in RRC signaling, or a resource identification as defined by a location index of a resource of an associated reference signal resource set.

In an eleventh aspect, alone or in combination with one or more of the first through tenth aspects, the location index comprises one or more of an index associated with any location within the associated reference signal resource set, or an index associated with a particular location within the associated reference signal resource set.

In a twelfth aspect, alone or in combination with one or more of the first through eleventh aspects, the report indicates one or more beam metrics associated with the one or more base station beams.

In a thirteenth aspect, alone or in combination with one or more of the first through twelfth aspects, the CSI report configuration indicates a configuration of a first set of channel measurement resources with repetitions to be used to receive, via multiple UE beams, a first set of reference signals transmitted via a first base station beam, wherein the CSI report configuration indicates a configuration of a first set of interference measurement resources with repetitions, paired with the first set of channel measurement resources, to be used to receive, via the multiple UE beams, the first set of reference signals transmitted via the first base station beam, wherein the CSI report configuration indicates a configuration of a second set of channel measurement resources with repetitions to be used to receive, via the multiple UE beams, a second set of reference signals transmitted via a second base station beam, and wherein the CSI report configuration indicates a configuration of a second set of interference measurement resources with repetitions, paired with the second set of channel measurement resources, to be used to receive, via the second base station beam using multiple UE beams, the second set of reference signals transmitted via the second base station beam.

In a fourteenth aspect, alone or in combination with one or more of the first through thirteenth aspects, UE beam refinement comprises measuring a layer 1 SINR associated with pairs of channel measurement resources and interference measurement resources using multiple UE beams.

In a fifteenth aspect, alone or in combination with one or more of the first through fourteenth aspects, base station beam refinement comprises transmitting a report that indicates one or more base station beams associated with one or more paired UE beams to recommend for subsequent communications based at least in part on measuring layer 1 SINRs associated with the multiple reference signal resource sets using different UE beams.

In a sixteenth aspect, alone or in combination with one or more of the first through fifteenth aspects, the report indicates a base station beam, of the one or more base station beams, via one or more of a resource identification of a reference signal resource of the first set of channel measurement resources, a resource identification of a reference signal resource of the first set of interference measurement resources, a resource identification of a reference signal resource of the second set of channel measurement resources, a resource identification of a reference signal resource of the second set of interference measurement resources.

In a seventeenth aspect, alone or in combination with one or more of the first through sixteenth aspects, the resource identification comprises a resource identification as defined in RRC signaling, a resource identification as defined by a location index of a resource of the first set of channel measurement resources, a resource identification as defined by a location index of a resource of the first set of interference measurement resources, a resource identification as defined by a location index of a resource of the second set of channel measurement resources, or a resource identification as defined by a location index of a resource of the second set of interference measurement resources.

In an eighteenth aspect, alone or in combination with one or more of the first through seventeenth aspects, the location index comprises one or more of an index associated with any location within the associated reference signal resource set, or an index associated with a particular location within the associated reference signal resource set.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a diagram illustrating an example process 600 performed, for example, by a base station, in accordance with the present disclosure. Example process 600 is an example where the base station (e.g., base station 110) performs operations associated with configuring CSI report configurations.

As shown in FIG. 6, in some aspects, process 600 may include transmitting a CSI report configuration associated with multiple reference signal resource sets, all reference signal resources in each reference signal resource set associated with a different base station beam, for one or more beam measurements (e.g., one or more of channel measurements or interference measurements) (block 610). For example, the base station (e.g., using transmission component 804, depicted in FIG. 8) may transmit a CSI report configuration associated with multiple reference signal resource sets, all reference signal resources in each reference signal resource set associated with a different base station beam, for one or more beam measurements (e.g., one or more of channel measurements or interference measurements), as described above.

As further shown in FIG. 6, in some aspects, process 600 may include receiving a report, based at least in part on the CSI report configuration, that indicates one or more base station beams recommended for subsequent communications with a UE (block 620). For example, the base station (e.g., using reception component 802, depicted in FIG. 8) may receive a report, based at least in part on the CSI report configuration, that indicates one or more base station beams recommended for subsequent communications with a UE, as described above.

Process 600 may include additional aspects, such as any single aspect or any combination of aspects described below and/or in connection with one or more other processes described elsewhere herein.

In a first aspect, the CSI report configuration indicates that the UE is to perform a joint procedure of base station beam refinement and UE beam refinement based at least in part on reception of the one or more reference signals associated with reference signal resources of the multiple reference signal resource sets, or wherein additional signaling to the UE indicates that the UE is to perform the joint procedure of base station beam refinement and UE beam refinement based at least in part on reception of the one or more reference signals.

In a second aspect, alone or in combination with the first aspect, performance of the joint procedure of base station beam refinement and UE beam refinement comprises receiving, using a first UE beam, a first reference signal associated with a first reference signal resource of a first reference signal resource set that is associated with a first base station beam, receiving, using a second UE beam, a second reference signal associated with a second reference signal resource of the first reference signal resource set that is associated with the first base station beam, receiving, using the first UE beam, a third reference signal associated with a third reference signal resource of a second reference signal resource set that is associated with a second base station beam, and receiving, using the second UE beam, a fourth reference signal associated with a fourth reference signal resource of the second reference signal resource set that is associated with the second base station beam.

In a third aspect, alone or in combination with one or more of the first and second aspects, UE beam refinement comprises a determination of preferred UE beams to use with one or more recommended base station beams for subsequent communications.

In a fourth aspect, alone or in combination with one or more of the first through third aspects, base station beam refinement comprises a determination of one or more base station beams, paired with one or more UE beams, to recommend for subsequent communications.

In a fifth aspect, alone or in combination with one or more of the first through fourth aspects, the CSI report configuration includes a first indication, within a repetition field associated with a first reference signal resource set, that each reference signal resource in the first reference signal resource set is associated with a first base station beam, and wherein the CSI report configuration includes a second indication, within a repetition field associated with a second reference signal resource set, that each reference signal resource in the second reference signal resource set is associated with a second base station beam.

In a sixth aspect, alone or in combination with one or more of the first through fifth aspects, process 600 includes transmitting, based at least in part on the CSI report configuration, one or more reference signals comprising one or more of CSI reference signals, or signal blocks.

In a seventh aspect, alone or in combination with one or more of the first through sixth aspects, the CSI report configuration indicates, via a first TCI state identification, that a first reference signal resource set is associated with a first base station beam, and wherein the CSI report configuration indicates, via a second TCI state identification, that a second reference signal resource set is associated with a second base station beam.

In an eighth aspect, alone or in combination with one or more of the first through seventh aspects, the report indicates a base station beam, of the one or more base station beams, via one or more of an identification of a reference signal resource set associated with the base station beam, or a resource identification of a reference signal resource of the reference signal resource set associated with the base station beam.

In a ninth aspect, alone or in combination with one or more of the first through eighth aspects, the resource identification comprises a resource identification as defined in RRC signaling, or a resource identification as defined by a location index of a resource of an associated reference signal resource set.

In a tenth aspect, alone or in combination with one or more of the first through ninth aspects, the location index comprises one or more of an index associated with any location within the associated reference signal resource set, or an index associated with a particular location within the associated reference signal resource set.

In an eleventh aspect, alone or in combination with one or more of the first through tenth aspects, the report indicates one or more beam metrics associated with the one or more base station beams.

In a twelfth aspect, alone or in combination with one or more of the first through eleventh aspects, the CSI report configuration indicates a configuration of a first set of channel measurement resources with repetitions to be used to receive, via multiple UE beams, a first set of reference signals transmitted via a first base station beam, wherein the CSI report configuration indicates a configuration of a first set of interference measurement resources with repetitions, paired with the first set of channel measurement resources, to be used to receive, via the multiple UE beams, the first set of reference signals transmitted via the first base station beam, wherein the CSI report configuration indicates a configuration of a second set of channel measurement resources with repetitions to be used to receive, via the multiple UE beams, a second set of reference signals transmitted via a second base station beam, and wherein the CSI report configuration indicates a configuration of a second set of interference measurement resources with repetitions, paired with the second set of channel measurement resources, to be used to receive, via the second base station beam using multiple UE beams, the second set of reference signals transmitted via the second base station beam.

In a thirteenth aspect, alone or in combination with one or more of the first through twelfth aspects, the report indicates the one or more base station beams based at least in part on measurements of layer 1 SINRs associated with pairs of channel measurement resources and interference measurement resources. the multiple reference signal resource sets using different UE beams.

In a fourteenth aspect, alone or in combination with one or more of the first through thirteenth aspects, the report indicates a base station beam, of the one or more base station beams, via one or more of a resource identification of a reference signal resource of the first set of channel measurement resources, a resource identification of a reference signal resource of the first set of interference measurement resources, a resource identification of a reference signal resource of the second set of channel measurement resources, a resource identification of a reference signal resource of the second set of interference measurement resources.

In a fifteenth aspect, alone or in combination with one or more of the first through fourteenth aspects, the resource identification comprises a resource identification as defined in RRC signaling, a resource identification as defined by a location index of a resource of the first set of channel measurement resources, a resource identification as defined by a location index of a resource of the first set of interference measurement resources, a resource identification as defined by a location index of a resource of the second set of channel measurement resources, or a resource identification as defined by a location index of a resource of the second set of interference measurement resources.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
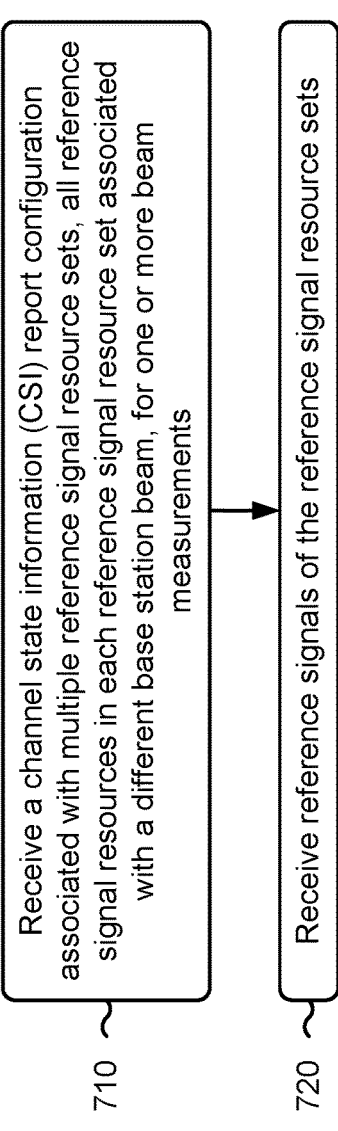

FIG. 7 is a diagram illustrating an example process 700 performed, for example, by a UE, in accordance with the present disclosure. Example process 700 is an example where the UE (e.g., UE 120) performs operations associated with channel state information report configuration.

As shown in FIG. 7, in some aspects, process 700 may include receiving a CSI report configuration associated with multiple reference signal resource sets, all reference signal resources in each reference signal resource set associated with a different base station beam, for one or more beam measurements (block 710). For example, the UE (e.g., using reception component 902, depicted in FIG. 9) may receive a CSI report configuration associated with multiple reference signal resource sets, all reference signal resources in each reference signal resource set associated with a different base station beam, for one or more beam measurements, as described above.

As further shown in FIG. 7, in some aspects, process 700 may include receiving reference signals of the reference signal resource sets (block 720). For example, the UE (e.g., using reception component 902, depicted in FIG. 9) may receive reference signals of the reference signal resource sets, as described above.

Process 700 may include additional aspects, such as any single aspect or any combination of aspects described below and/or in connection with one or more other processes described elsewhere herein.

In a first aspect, process 700 includes performing a joint procedure of base station beam refinement and UE beam refinement based at least in part on reception of one or more reference signals associated with reference signal resources of the multiple reference signal resource sets.

In a second aspect, alone or in combination with the first aspect, UE beam refinement comprises determining preferred UE beams to use with one or more recommended base station beams for subsequent communications.

In a third aspect, alone or in combination with one or more of the first and second aspects, the CSI report configuration includes a first indication, within a repetition field associated with all reference signal resources in a first reference signal resource set, that all reference signal resources in the first reference signal resource set are associated with a first base station beam, and wherein the CSI report configuration includes a second indication, within a repetition field associated with all reference signal resources in a second reference signal resource set, that all reference signal resources in the second reference signal resource set are associated with a second base station beam.

In a fourth aspect, alone or in combination with one or more of the first through third aspects, process 700 further comprises performing a joint procedure of base station beam refinement and UE beam refinement comprising receiving, using a first UE beam, a first reference signal associated with a first reference signal resource of a first reference signal resource set, associated with a first base station beam, receiving, using a second UE beam, a second reference signal associated with a second reference signal resource of the first reference signal resource set, associated with the first base station beam, receiving, using a first UE beam, a third reference signal associated with a third reference signal resource of a second reference signal resource set, associated with a second base station beam, and receiving, using a second UE beam, a fourth reference signal associated with a fourth reference signal resource of the second reference signal resource set, associated with the second base station beam.

In a fifth aspect, alone or in combination with one or more of the first through fourth aspects, UE beam refinement comprises one or more of determining to use the first UE beam or the second UE beam for subsequent communications using a first base station beam associated with the first reference signal resource set, or determining to use the first UE beam or the second UE beam for subsequent communications using a second base station beam associated with the second reference signal resource set.

In a sixth aspect, alone or in combination with one or more of the first through fifth aspects, the CSI report configuration indicates, via a first TCI state identification, that a first reference signal resource set is associated with a first base station beam, and wherein the CSI report configuration indicates, via a second TCI state identification, that a second reference signal resource set is associated with a second base station beam.

In a seventh aspect, alone or in combination with one or more of the first through sixth aspects, base station beam refinement comprises one or more of determining one or more base station beams, paired with one or more UE beams, to recommend for subsequent communications, or transmitting a report that indicates the one or more base station beams to recommend for the subsequent communications.

In an eighth aspect, alone or in combination with one or more of the first through seventh aspects, the report indicates a base station beam, of the one or more base station beams, via one or more of an identification of a reference signal resource set associated with the base station beam, or a resource identification of a reference signal resource of the reference signal resource set associated with the base station beam.

In a ninth aspect, alone or in combination with one or more of the first through eighth aspects, the resource identification comprises a resource identification as defined in radio resource control signaling, or a resource identification as defined by a location index of a resource of an associated reference signal resource set.

In a tenth aspect, alone or in combination with one or more of the first through ninth aspects, the location index comprises one or more of an index associated with any location within the associated reference signal resource set, or an index associated with a particular location within the associated reference signal resource set.

In an eleventh aspect, alone or in combination with one or more of the first through tenth aspects, the report indicates one or more beam metrics associated with the one or more base station beams.

In a twelfth aspect, alone or in combination with one or more of the first through eleventh aspects, the CSI report configuration indicates a configuration of a first set of channel measurement resources with repetitions to be used to receive, via multiple UE beams, a first set of reference signals transmitted via a first base station beam, wherein the CSI report configuration indicates a configuration of a first set of interference measurement resources with repetitions, paired with the first set of channel measurement resources, to be used to receive, via the multiple UE beams, the first set of reference signals transmitted via the first base station beam, wherein the CSI report configuration indicates a configuration of a second set of channel measurement resources with repetitions to be used to receive, via the multiple UE beams, a second set of reference signals transmitted via a second base station beam, and wherein the CSI report configuration indicates a configuration of a second set of interference measurement resources with repetitions, paired with the second set of channel measurement resources, to be used to receive, via the second base station beam using multiple UE beams, the second set of reference signals transmitted via the second base station beam.

In a thirteenth aspect, alone or in combination with one or more of the first through twelfth aspects, UE beam refinement comprises measuring a layer 1 signal-to-interference-plus-noise ratio associated with pairs of channel measurement resources and interference measurement resources using multiple UE beams.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a base station, in accordance with the present disclosure. Example process 800 is an example where the base station (e.g., base station 110) performs operations associated with channel state information report configuration.

As shown in FIG. 8, in some aspects, process 800 may include transmitting a CSI report configuration associated with multiple reference signal resource sets, all reference signal resources in each reference signal resource set associated with a different base station beam, for one or more of channel measurements or interference measurements (block 810). For example, the base station (e.g., using transmission component 1004, depicted in FIG. 10) may transmit a CSI report configuration associated with multiple reference signal resource sets, all reference signal resources in each reference signal resource set associated with a different base station beam, for one or more of channel measurements or interference measurements, as described above.

As further shown in FIG. 8, in some aspects, process 800 may include transmitting reference signals of the multiple reference signal resource sets (block 820). For example, the base station (e.g., using transmission component 1004, depicted in FIG. 10) may transmit reference signals of the multiple reference signal resource sets, as described above.

Process 800 may include additional aspects, such as any single aspect or any combination of aspects described below and/or in connection with one or more other processes described elsewhere herein.

In a first aspect, process 800 includes receiving a report, based at least in part on the CSI report configuration, that indicates one or more base station beams recommended for subsequent communications with a UE.

In a second aspect, alone or in combination with the first aspect, the CSI report configuration indicates that the UE is to perform a joint procedure of base station beam refinement and UE beam refinement based at least in part on reception of the one or more reference signals associated with reference signal resources of the multiple reference signal resource sets, or wherein additional signaling to the UE indicates that the UE is to perform the joint procedure of base station beam refinement and UE beam refinement based at least in part on reception of the one or more reference signals.

In a third aspect, alone or in combination with one or more of the first and second aspects, performance of the joint procedure of base station beam refinement and UE beam refinement comprises receiving, using a first UE beam, a first reference signal associated with a first reference signal resource of a first reference signal resource set that is associated with a first base station beam, receiving, using a second UE beam, a second reference signal associated with a second reference signal resource of the first reference signal resource set that is associated with the first base station beam, receiving, using the first UE beam, a third reference signal associated with a third reference signal resource of a second reference signal resource set that is associated with a second base station beam, and receiving, using the second UE beam, a fourth reference signal associated with a fourth reference signal resource of the second reference signal resource set that is associated with the second base station beam.

In a fourth aspect, alone or in combination with one or more of the first through third aspects, UE beam refinement comprises a determination of preferred UE beams to use with one or more recommended base station beams for subsequent communications.

In a fifth aspect, alone or in combination with one or more of the first through fourth aspects, base station beam refinement comprises a determination of one or more base station beams, paired with one or more UE beams, to recommend for subsequent communications.

In a sixth aspect, alone or in combination with one or more of the first through fifth aspects, the CSI report configuration includes a first indication, within a repetition field associated with a first reference signal resource set, that each reference signal resource in the first reference signal resource set is associated with a first base station beam, and wherein the CSI report configuration includes a second indication, within a repetition field associated with a second reference signal resource set, that each reference signal resource in the second reference signal resource set is associated with a second base station beam.

In a seventh aspect, alone or in combination with one or more of the first through sixth aspects, the CSI report configuration indicates, via a first TCI state identification, that a first reference signal resource set is associated with a first base station beam, and wherein the CSI report configuration indicates, via a second TCI state identification, that a second reference signal resource set is associated with a second base station beam.

In an eighth aspect, alone or in combination with one or more of the first through seventh aspects, the report indicates a base station beam, of the one or more base station beams, via one or more of an identification of a reference signal resource set associated with the base station beam, or a resource identification of a reference signal resource of the reference signal resource set associated with the base station beam.

In a ninth aspect, alone or in combination with one or more of the first through eighth aspects, the resource identification comprises a resource identification as defined in radio resource control signaling, or a resource identification as defined by a location index of a resource of an associated reference signal resource set.

In a tenth aspect, alone or in combination with one or more of the first through ninth aspects, the location index comprises one or more of an index associated with any location within the associated reference signal resource set, or an index associated with a particular location within the associated reference signal resource set.

In an eleventh aspect, alone or in combination with one or more of the first through tenth aspects, the CSI report configuration indicates a configuration of a first set of channel measurement resources with repetitions to be used to receive, via multiple UE beams, a first set of reference signals transmitted via a first base station beam, wherein the CSI report configuration indicates a configuration of a first set of interference measurement resources with repetitions, paired with the first set of channel measurement resources, to be used to receive, via the multiple UE beams, the first set of reference signals transmitted via the first base station beam, wherein the CSI report configuration indicates a configuration of a second set of channel measurement resources with repetitions to be used to receive, via the multiple UE beams, a second set of reference signals transmitted via a second base station beam, and wherein the CSI report configuration indicates a configuration of a second set of interference measurement resources with repetitions, paired with the second set of channel measurement resources, to be used to receive, via the second base station beam using multiple UE beams, the second set of reference signals transmitted via the second base station beam.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
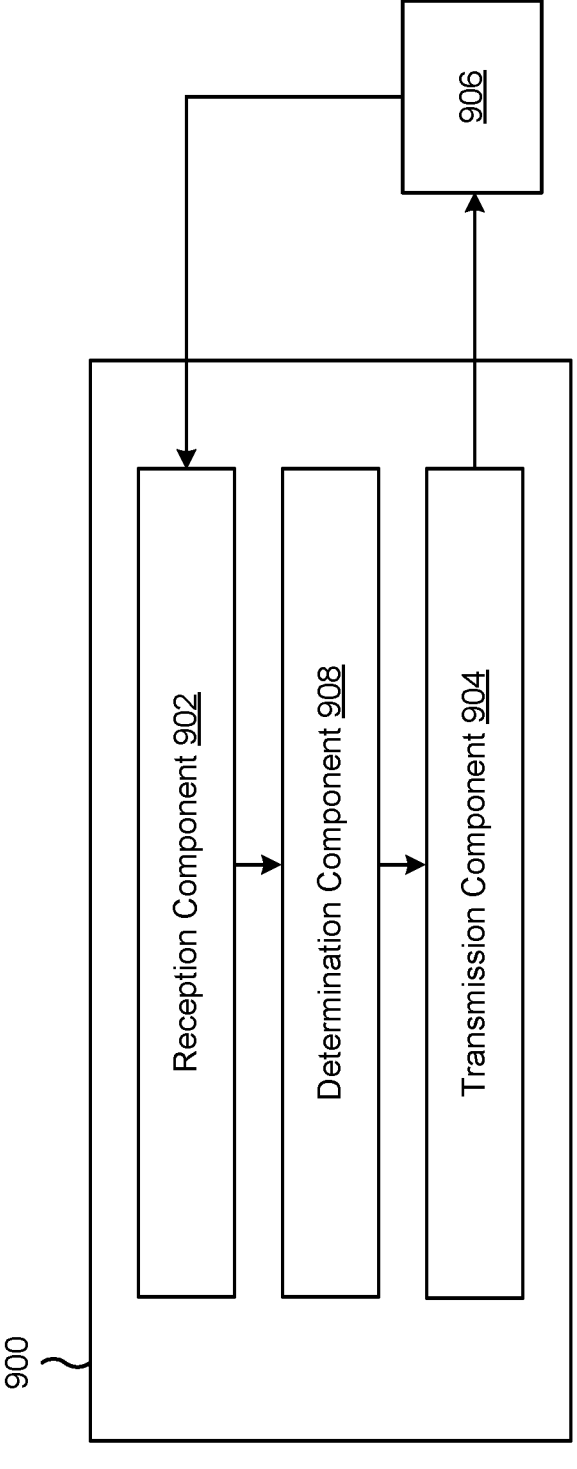
FIGS. 9 and 10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908.

In some aspects, the apparatus 900 may be configured to perform one or more operations described herein in connection with FIG. 4. Additionally, or alternatively, the apparatus 900 may be configured to perform one or more processes described herein, such as process 500 of FIG. 5, process 700 of FIG. 7, and/or some combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be collocated with the reception component 902 in a transceiver.

The reception component 902 may receive a CSI report configuration associated with multiple reference signal resource sets, all reference signal resources in each reference signal resource set associated with a different base station beam, for one or more of channel measurements or interference measurements. The reception component 902 and/or determination component 908 may perform a joint procedure of base station beam refinement and UE beam refinement based at least in part on reception of one or more reference signals associated with reference signal resources of the multiple reference signal resource sets.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
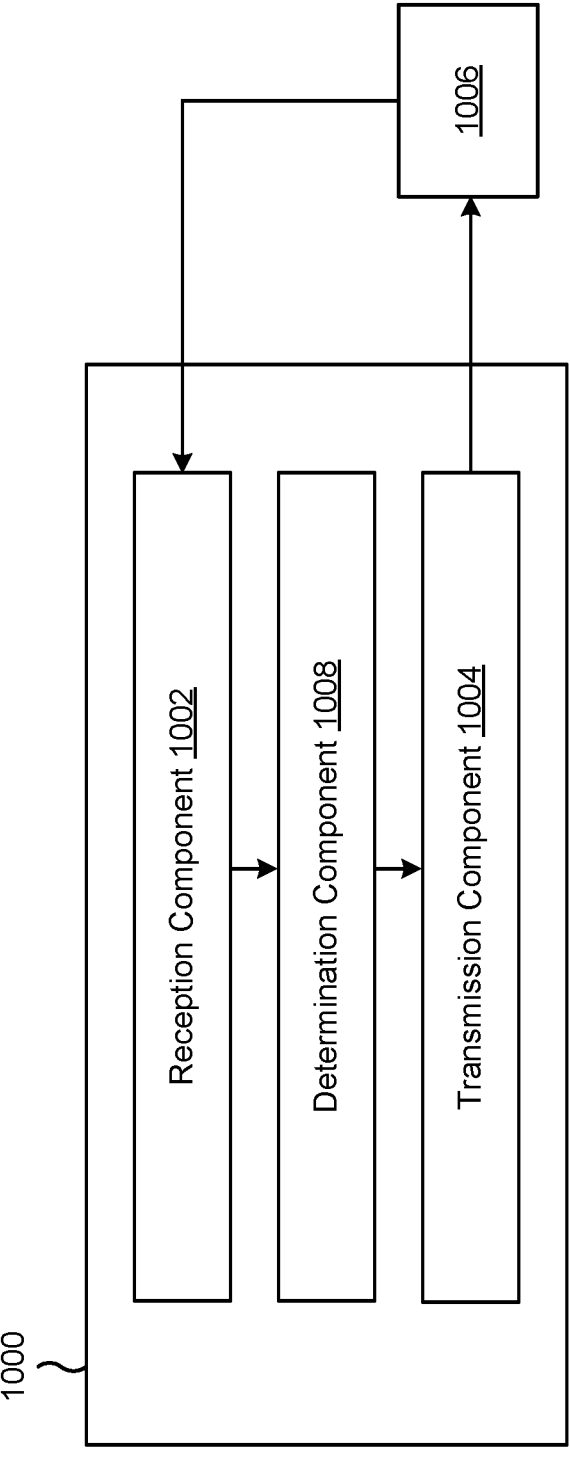

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008.

In some aspects, the apparatus 1000 may be configured to perform one or more operations described herein in connection with FIG. 4. Additionally, or alternatively, the apparatus 1000 may be configured to perform one or more processes described herein, such as process 600 of FIG. 6, process 800 of FIG. 8, and/or some combination thereof. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be collocated with the reception component 1002 in a transceiver.

The transmission component 1004 may transmit a CSI report configuration associated with multiple reference signal resource sets, all reference signal resources in each reference signal resource set associated with a different base station beam, for one or more of channel measurements or interference measurements. The reception component 1002 may receive a report, based at least in part on the CSI report configuration, that indicates one or more base station beams recommended for subsequent communications with a UE.

The transmission component 1004 may transmit, based at least in part on the CSI report configuration, one or more reference signals comprising one or more of CSI reference signals, or synchronization signal blocks.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving a channel state information (CSI) report configuration associated with multiple reference signal resource sets, all reference signal resources in each reference signal resource set associated with a different base station beam, for one or more beam measurements; and receiving reference signals of the reference signal resource sets.

Aspect 2: The method of Aspect 1, further comprising: performing a joint procedure of base station beam refinement and UE beam refinement based at least in part on reception of one or more reference signals associated with reference signal resources of the multiple reference signal resource sets.

Aspect 3: The method of any of Aspects 1-2, wherein UE beam refinement comprises: determining preferred UE beams to use with one or more recommended base station beams for subsequent communications.

Aspect 4: The method of any of Aspects 1-3, wherein the CSI report configuration includes a first indication, within a repetition field associated with all reference signal resources in a first reference signal resource set, that all reference signal resources in the first reference signal resource set are associated with a first base station beam, and wherein the CSI report configuration includes a second indication, within a repetition field associated with all reference signal resources in a second reference signal resource set, that all reference signal resources in the second reference signal resource set are associated with a second base station beam.

Aspect 5: The method of any of Aspects 1-4, further comprising performing a joint procedure of base station beam refinement and UE beam refinement comprising: receiving, using a first UE beam, a first reference signal associated with a first reference signal resource of a first reference signal resource set, associated with a first base station beam; receiving, using a second UE beam, a second reference signal associated with a second reference signal resource of the first reference signal resource set, associated with the first base station beam; receiving, using a first UE beam, a third reference signal associated with a third reference signal resource of a second reference signal resource set, associated with a second base station beam; and receiving, using a second UE beam, a fourth reference signal associated with a fourth reference signal resource of the second reference signal resource set, associated with the second base station beam.

Aspect 6: The method of Aspect 5, wherein UE beam refinement comprises one or more of: determining to use the first UE beam or the second UE beam for subsequent communications using a first base station beam associated with the first reference signal resource set; or determining to use the first UE beam or the second UE beam for subsequent communications using a second base station beam associated with the second reference signal resource set.

Aspect 7: The method of any of Aspects 1-6, wherein the CSI report configuration indicates, via a first transmission configuration indicator (TCI) state identification, that a first reference signal resource set is associated with a first base station beam, and wherein the CSI report configuration indicates, via a second TCI state identification, that a second reference signal resource set is associated with a second base station beam.

Aspect 8: The method of any of Aspects 1-7, wherein base station beam refinement comprises one or more of: determining one or more base station beams, paired with one or more UE beams, to recommend for subsequent communications; or transmitting a report that indicates the one or more base station beams to recommend for the subsequent communications.

Aspect 9: The method of Aspect 8, wherein the report indicates a base station beam, of the one or more base station beams, via one or more of: an identification of a reference signal resource set associated with the base station beam, or a resource identification of a reference signal resource of the reference signal resource set associated with the base station beam.

Aspect 10: The method of Aspect 9, wherein the resource identification comprises: a resource identification as defined in radio resource control signaling, or a resource identification as defined by a location index of a resource of an associated reference signal resource set.

Aspect 11: The method of Aspect 10, wherein the location index comprises one or more of: an index associated with any location within the associated reference signal resource set, or an index associated with a particular location within the associated reference signal resource set.

Aspect 12: The method of any of Aspects 8-11, wherein the report indicates one or more beam metrics associated with the one or more base station beams.

Aspect 13: The method of any of Aspects 1-12, wherein the CSI report configuration indicates a configuration of a first set of channel measurement resources with repetitions to be used to receive, via multiple UE beams, a first set of reference signals transmitted via a first base station beam, wherein the CSI report configuration indicates a configuration of a first set of interference measurement resources with repetitions, paired with the first set of channel measurement resources, to be used to receive, via the multiple UE beams, the first set of reference signals transmitted via the first base station beam, wherein the CSI report configuration indicates a configuration of a second set of channel measurement resources with repetitions to be used to receive, via the multiple UE beams, a second set of reference signals transmitted via a second base station beam, and wherein the CSI report configuration indicates a configuration of a second set of interference measurement resources with repetitions, paired with the second set of channel measurement resources, to be used to receive, via the second base station beam using multiple UE beams, the second set of reference signals transmitted via the second base station beam.

Aspect 14: The method of Aspect 13, wherein UE beam refinement comprises: measuring a layer 1 signal-to-interference-plus-noise ratio associated with pairs of channel measurement resources and interference measurement resources using multiple UE beams.

Aspect 15: A method of wireless communication performed by a base station, comprising: transmitting a channel state information (CSI) report configuration associated with multiple reference signal resource sets, all reference signal resources in each reference signal resource set associated with a different base station beam, for one or more of channel measurements or interference measurements; and transmitting reference signals of the multiple reference signal resource sets.

Aspect 16: The method of Aspect 15, further comprising: receiving a report, based at least in part on the CSI report configuration, that indicates one or more base station beams recommended for subsequent communications with a user equipment (UE).

Aspect 17: The method of any of Aspects 15-16, wherein the CSI report configuration indicates that the UE is to perform a joint procedure of base station beam refinement and UE beam refinement based at least in part on reception of the one or more reference signals associated with reference signal resources of the multiple reference signal resource sets, or wherein additional signaling to the UE indicates that the UE is to perform the joint procedure of base station beam refinement and UE beam refinement based at least in part on reception of the one or more reference signals.

Aspect 18: The method of Aspect 17, wherein performance of the joint procedure of base station beam refinement and UE beam refinement comprises: receiving, using a first UE beam, a first reference signal associated with a first reference signal resource of a first reference signal resource set that is associated with a first base station beam; receiving, using a second UE beam, a second reference signal associated with a second reference signal resource of the first reference signal resource set that is associated with the first base station beam; receiving, using the first UE beam, a third reference signal associated with a third reference signal resource of a second reference signal resource set that is associated with a second base station beam; and receiving, using the second UE beam, a fourth reference signal associated with a fourth reference signal resource of the second reference signal resource set that is associated with the second base station beam.

Aspect 19: The method of Aspect 18, wherein UE beam refinement comprises: a determination of preferred UE beams to use with one or more recommended base station beams for subsequent communications.

Aspect 20: The method of any of Aspects 18-19, wherein base station beam refinement comprises: a determination of one or more base station beams, paired with one or more UE beams, to recommend for subsequent communications.

Aspect 21: The method of any of Aspects 15-20, wherein the CSI report configuration includes a first indication, within a repetition field associated with a first reference signal resource set, that each reference signal resource in the first reference signal resource set is associated with a first base station beam, and wherein the CSI report configuration includes a second indication, within a repetition field associated with a second reference signal resource set, that each reference signal resource in the second reference signal resource set is associated with a second base station beam.

Aspect 22: The method of any of Aspects 15-21, wherein the CSI report configuration indicates, via a first transmission configuration indicator (TCI) state identification, that a first reference signal resource set is associated with a first base station beam, and wherein the CSI report configuration indicates, via a second TCI state identification, that a second reference signal resource set is associated with a second base station beam.

Aspect 23: The method of any of Aspects 15-22, wherein the report indicates a base station beam, of the one or more base station beams, via one or more of: an identification of a reference signal resource set associated with the base station beam, or a resource identification of a reference signal resource of the reference signal resource set associated with the base station beam.

Aspect 24: The method of Aspect 23, wherein the resource identification comprises: a resource identification as defined in radio resource control signaling, or a resource identification as defined by a location index of a resource of an associated reference signal resource set.

Aspect 25: The method of Aspect 24, wherein the location index comprises one or more of: an index associated with any location within the associated reference signal resource set, or an index associated with a particular location within the associated reference signal resource set.

Aspect 26: The method of any of Aspects 15-25, wherein the CSI report configuration indicates a configuration of a first set of channel measurement resources with repetitions to be used to receive, via multiple UE beams, a first set of reference signals transmitted via a first base station beam, wherein the CSI report configuration indicates a configuration of a first set of interference measurement resources with repetitions, paired with the first set of channel measurement resources, to be used to receive, via the multiple UE beams, the first set of reference signals transmitted via the first base station beam, wherein the CSI report configuration indicates a configuration of a second set of channel measurement resources with repetitions to be used to receive, via the multiple UE beams, a second set of reference signals transmitted via a second base station beam, and wherein the CSI report configuration indicates a configuration of a second set of interference measurement resources with repetitions, paired with the second set of channel measurement resources, to be used to receive, via the second base station beam using multiple UE beams, the second set of reference signals transmitted via the second base station beam.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, configured to:

receive a channel state information (CSI) configuration associated with a joint procedure of base station beam refinement and UE beam refinement, wherein the CSI configuration is associated with multiple reference signal resource sets that are each associated with a different base station beam of multiple base station beams, and wherein each reference signal resource set, of the multiple reference signal resource sets, includes multiple reference signal repetitions for a particular base station beam of the multiple base station beams, wherein the CSI configuration includes a first indication, within a repetition field associated with all reference signal resources in a first reference signal resource set, that all reference signal resources in the first reference signal resource set are associated with a first base station beam, and wherein the CSI configuration includes a second indication, within a repetition field associated with all reference signal resources in a second reference signal resource set, that all reference signal resources in the second reference signal resource set are associated with a second base station beam;

receive, for each reference signal resource set of the multiple reference signal resource sets, the multiple reference signal repetitions for the particular base station beam using different UE beams; and determine preferred UE beams for pairing with each base station beam, of the multiple base station beams, based at least in part on receiving the multiple reference signal repetitions for each reference signal resource set of the multiple reference signal resource sets.

2. The UE of claim 1, wherein the one or more processors are further configured to:

perform the joint procedure of the base station beam refinement and the UE beam refinement based at least in part on reception of one or more reference signals associated with reference signal resources of the multiple reference signal resource sets.

3. The UE of claim 1, wherein the one or more processors are further configured to perform the joint procedure of the base station beam refinement and the UE beam refinement comprising:

receipt, using a first UE beam, of a first reference signal associated with a first reference signal resource of the first reference signal resource set, associated with the first base station beam;

receipt, using a second UE beam, of a second reference signal associated with a second reference signal resource of the first reference signal resource set, associated with the first base station beam;

receipt, using the first UE beam, of a third reference signal associated with a third reference signal resource of the second reference signal resource set, associated with the second base station beam; and receipt, using the second UE beam, of a fourth reference signal associated with a fourth reference signal resource of the second reference signal resource set, associated with the second base station beam.

4. The UE of claim 3, wherein the one or more processors, to perform beam refinement, are further configured to:

determine to use the first UE beam or the second UE beam for subsequent communications using the first base station beam associated with the first reference signal resource set; or determine to use the first UE beam or the second UE beam for subsequent communications using the second base station beam associated with the second reference signal resource set.

5. The UE of claim 1, wherein the CSI configuration indicates, via a first transmission configuration indicator (TCI) state identification, that the first reference signal resource set is associated with the first base station beam, and wherein the CSI configuration indicates, via a second TCI state identification, that the second reference signal resource set is associated with the second base station beam.

6. The UE of claim 1, wherein the one or more processors, to perform base station refinement, are further configured to:

determine one or more base station beams, paired with one or more UE beams, to recommend for subsequent communications; or transmit a report that indicates the one or more base station beams to recommend for the subsequent communications.

7. The UE of claim 6, wherein the report indicates a base station beam, of the one or more base station beams, via one or more of:

an identification of a reference signal resource set associated with the base station beam, or a resource identification of a reference signal resource of the reference signal resource set associated with the base station beam.

8. The UE of claim 7, wherein the resource identification comprises:

a resource identification as defined in radio resource control signaling, or a resource identification as defined by a location index of a resource of an associated reference signal resource set.

9. The UE of claim 8, wherein the location index comprises one or more of:

an index associated with any location within the associated reference signal resource set, or an index associated with a particular location within the associated reference signal resource set.

10. The UE of claim 6, wherein the report indicates one or more beam metrics associated with the one or more base station beams.

11. The UE of claim 1, wherein the CSI configuration indicates a configuration of a first set of channel measurement resources with repetitions to be used to receive, via multiple UE beams, a first set of reference signals transmitted via the first base station beam, wherein the CSI configuration indicates a configuration of a first set of interference measurement resources with repetitions, paired with the first set of channel measurement resources, to be used to receive, via the multiple UE beams, the first set of reference signals transmitted via the first base station beam, wherein the CSI configuration indicates a configuration of a second set of channel measurement resources with repetitions to be used to receive, via the multiple UE beams, a second set of reference signals transmitted via the second base station beam, and wherein the CSI configuration indicates a configuration of a second set of interference measurement resources with repetitions, paired with the second set of channel measurement resources, to be used to receive, via the second base station beam using multiple UE beams, the second set of reference signals transmitted via the second base station beam.

12. The UE of claim 11, wherein the one or more processors, to perform beam refinement, are further configured to:

measure a layer 1 signal-to-interference-plus-noise ratio associated with pairs of channel measurement resources and interference measurement resources using multiple UE beams.

13. A base station for wireless communication, comprising:

one or more memories; and one or more processors, coupled to the one or more memories, configured to:

transmit a channel state information (CSI) configuration associated with a joint procedure of base station beam refinement and user equipment (UE) beam refinement, associated with a UE, wherein the CSI configuration is associated with multiple reference signal resource sets that are each associated with a different base station beam of multiple base station beams, and wherein each reference signal resource set, of the multiple reference signal resource sets, includes multiple reference signal repetitions for a particular base station beam of the multiple base station beams, wherein the CSI configuration includes a first indication, within a repetition field associated with all reference signal resources in a first reference signal resource set, that all reference signal resources in the first reference signal resource set are associated with a first base station beam, and wherein the CSI configuration includes a second indication, within a repetition field associated with all reference signal resources in a second reference signal resource set, that all reference signal resources in the second reference signal resource set are associated with a second base station beam; and transmit, for each reference signal resource set of the multiple reference signal resource sets, the multiple reference signal repetitions for the particular base station beam, wherein the multiple reference signal repetitions for the particular base station beam are configured to be received using different beams to determine preferred UE beams for pairing with each base station beam of the multiple base station beams.

14. The base station of claim 13, wherein the one or more processors are further configured to:

receive a report, based at least in part on the CSI configuration, that indicates one or more base station beams recommended for subsequent communications with the UE.

15. The base station of claim 13, wherein the base station beam refinement comprises:

a determination of one or more base station beams, paired with one or more UE beams, to recommend for subsequent communications.

16. The base station of claim 13, wherein the CSI configuration indicates, via a first transmission configuration indicator (TCI) state identification, that the first reference signal resource set is associated with the first base station beam, and wherein the CSI configuration indicates, via a second TCI state identification, that the second reference signal resource set is associated with the second base station beam.

17. The base station of claim 13, wherein a report, that is based at least in part on the CSI configuration and indicates one or more base station beams recommended for subsequent communications with the UE indicates a base station beam, of the one or more base station beams, via one or more of:

an identification of a reference signal resource set associated with the base station beam, or a resource identification of a reference signal resource of the reference signal resource set associated with the base station beam.

18. The base station of claim 17, wherein the resource identification comprises:

a resource identification as defined in radio resource control signaling, or a resource identification as defined by a location index of a resource of an associated reference signal resource set.

19. The base station of claim 18, wherein the location index comprises one or more of:

an index associated with any location within the associated reference signal resource set, or an index associated with a particular location within the associated reference signal resource set.

20. The base station of claim 13, wherein the CSI configuration indicates a configuration of a first set of channel measurement resources with repetitions to be used to receive, via multiple UE beams, a first set of reference signals transmitted via the first base station beam, wherein the CSI configuration indicates a configuration of a first set of interference measurement resources with repetitions, paired with the first set of channel measurement resources, to be used to receive, via the multiple UE beams, the first set of reference signals transmitted via the first base station beam, wherein the CSI configuration indicates a configuration of a second set of channel measurement resources with repetitions to be used to receive, via the multiple UE beams, a second set of reference signals transmitted via the second base station beam, and wherein the CSI configuration indicates a configuration of a second set of interference measurement resources with repetitions, paired with the second set of channel measurement resources, to be used to receive, via the second base station beam using multiple UE beams, the second set of reference signals transmitted via the second base station beam.

21. A method of wireless communication performed by a user equipment (UE), comprising:

receiving a channel state information (CSI) configuration associated with a joint procedure of base station beam refinement and UE beam refinement, wherein the CSI configuration is associated with multiple reference signal resource sets that are each associated with a different base station beam of multiple base station beams, and wherein each reference signal resource set, of the multiple reference signal resource sets, includes multiple reference signal repetitions for a particular base station beam of the multiple base station beams, wherein the CSI configuration includes a first indication, within a repetition field associated with all reference signal resources in a first reference signal resource set, that all reference signal resources in the first reference signal resource set are associated with a first base station beam, and wherein the CSI configuration includes a second indication, within a repetition field associated with all reference signal resources in a second reference signal resource set, that all reference signal resources in the second reference signal resource set are associated with a second base station beam;

receiving, for each reference signal resource set of the multiple reference signal resource sets, the multiple reference signal repetitions for the particular base station beam using different UE beams; and determining preferred UE beams for pairing with each base station beam, of the multiple base station beams, based at least in part on receiving the multiple reference signal repetitions for each reference signal resource set of the multiple reference signal resource sets.

22. The method of claim 21, wherein the CSI configuration indicates, via a first transmission configuration indicator (TCI) state identification, that the first reference signal resource set is associated with the first base station beam, and wherein the CSI configuration indicates, via second TCI state identification, that the second reference signal resource set is associated with the second base station beam.

23. The method of claim 21, wherein performing the joint procedure of base station beam refinement and UE beam refinement comprises:

receiving, using a first UE beam, a first reference signal associated with a first reference signal resource of a first reference signal resource set, associated with the first base station beam;

receiving, using a second UE beam, a second reference signal associated with a second reference signal resource of the first reference signal resource set, associated with the first base station beam;

receiving, using the first UE beam, a third reference signal associated with a third reference signal resource of a second reference signal resource set, associated with the second base station beam; and receiving, using the second UE beam, a fourth reference signal associated with a fourth reference signal resource of the second reference signal resource set, associated with the second base station beam.

24. The method of claim 21, wherein the CSI configuration indicates a configuration of a first set of channel measurement resources with repetitions to be used to receive, via multiple UE beams, a first set of reference signals transmitted via the first base station beam, wherein the CSI configuration indicates a configuration of a first set of interference measurement resources with repetitions, paired with the first set of channel measurement resources, to be used to receive, via the multiple UE beams, the first set of reference signals transmitted via the first base station beam, wherein the CSI configuration indicates a configuration of a second set of channel measurement resources with repetitions to be used to receive, via the multiple UE beams, a second set of reference signals transmitted via the second base station beam, and wherein the CSI configuration indicates a configuration of a second set of interference measurement resources with repetitions, paired with the second set of channel measurement resources, to be used to receive, via the second base station beam using multiple UE beams, the second set of reference signals transmitted via the second base station beam.

25. The method of claim 21, further comprising:

performing the joint procedure of the base station beam refinement and the UE beam refinement based at least in part on reception of one or more reference signals associated with reference signal resources of the multiple reference signal resource sets.

26. The method of claim 23, wherein performing the joint procedure of base station beam refinement comprises:

determining to use the first UE beam or the second UE beam for subsequent communications using the first base station beam associated with the first reference signal resource set; or determining to use the first UE beam or the second UE beam for subsequent communications using the second base station beam associated with the second reference signal resource set.

27. The method of claim 21, wherein the CSI configuration indicates, via a first transmission configuration indicator (TCI) state identification, that the first reference signal resource set is associated with the first base station beam, and wherein the CSI configuration indicates, via a second TCI state identification, that the second reference signal resource set is associated with the second base station beam.

28. The method of claim 23, wherein performing the joint procedure of base station beam refinement comprises:

determining one or more base station beams, paired with one or more UE beams, to recommend for subsequent communications; or transmitting a report that indicates the one or more base station beams to recommend for the subsequent communications.

29. A method of wireless communication performed by a base station, comprising:

transmitting a channel state information (CSI) configuration associated with a joint procedure of base station beam refinement and user equipment (UE) beam refinement, associated with a UE, wherein the CSI configuration is associated with multiple reference signal resource sets that are each associated with a different base station beam of multiple base station beams, and wherein each reference signal resource set, of the multiple reference signal resource sets, includes multiple reference signal repetitions for a particular base station beam of the multiple base station beams, wherein the CSI configuration includes a first indication, within a repetition field associated with all reference signal resources in a first reference signal resource set, that all reference signal resources in the first reference signal resource set are associated with a first base station beam, and wherein the CSI configuration includes a second indication, within a repetition field associated with all reference signal resources in a second reference signal resource set, that all reference signal resources in the second reference signal resource set are associated with a second base station beam; and transmitting, for each reference signal resource set of the multiple reference signal resource sets, the multiple reference signal repetitions for the particular base station beam, wherein the multiple reference signal repetitions for the particular base station beam are configured to be received using different beams to determine preferred UE beams for pairing with each base station beam of the multiple base station beams.

30. The method of claim 29, wherein the CSI configuration indicates, via a first transmission configuration indicator (TCI) state identification, that the first reference signal resource set is associated with the first base station beam, and wherein the CSI configuration indicates, via a second TCI state identification, that the second reference signal resource set is associated with the second base station beam.

\* \* \* \* \*